US011131756B2

(12) United States Patent
Slobodyanyuk et al.

(10) Patent No.: US 11,131,756 B2
(45) Date of Patent: Sep. 28, 2021

(54) LIDAR SYSTEM WITH REFLECTED SIGNAL STRENGTH MEASUREMENT

(71) Applicant: QUALCOMM Incorporated, San Diego, CA (US)

(72) Inventors: Volodimir Slobodyanyuk, San Diego, CA (US); Manav Raina, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 15/230,911

(22) Filed: Aug. 8, 2016

(65) Prior Publication Data
US 2017/0090019 A1    Mar. 30, 2017

Related U.S. Application Data

(60) Provisional application No. 62/234,328, filed on Sep. 29, 2015.

(51) Int. Cl.
*G01S 7/4861* (2020.01)
*G01S 7/486* (2020.01)
(Continued)

(52) U.S. Cl.
CPC .......... *G01S 7/4861* (2013.01); *G01S 7/4865* (2013.01); *G01S 7/4868* (2013.01); *G01S 17/10* (2013.01); *G01S 17/14* (2020.01)

(58) Field of Classification Search
CPC .............. G01C 3/00; G01S 7/00; G01S 17/00
See application file for complete search history.

(56) References Cited

U.S. PATENT DOCUMENTS

| 4,853,543 A | 8/1989 | Ozdemir |
| 5,291,262 A * | 3/1994 | Dunne ................. G01C 15/002 356/28 |

(Continued)

FOREIGN PATENT DOCUMENTS

| CN | 103630908 A | 3/2014 |
| CN | 103698305 A | 4/2014 |

(Continued)

OTHER PUBLICATIONS

International Search Report and Written Opinion—PCT/US2016/046123—ISA/EPO—dated Nov. 11, 2016.

*Primary Examiner* — Yuqing Xiao
*Assistant Examiner* — Amir J Askarian
(74) *Attorney, Agent, or Firm* — Thien T. Nguyen

(57) ABSTRACT

An example LIDAR system includes a detector, an amplifier, a time-to-digital converter (TDC), an integrator, an analog-to-digital converter (ADC), and a processor. The detector is configured to receive a reflected light pulse, where the reflected light pulse is reflected off of an object. The amplifier is coupled to the detector to generate an analog signal in response to the reflected light pulse. The TDC is coupled to the amplifier to generate a first time data and a second time data in response to the analog signal. The integrator is coupled to the amplifier to integrate the analog signal. The ADC is coupled to the integrator to sample an output of the integrator and to generate a digital sample. The processor is configured to process the first time data, the second time data, and the digital sample to estimate a total reflected energy of the reflected light pulse.

24 Claims, 9 Drawing Sheets

(51) Int. Cl.
  *G01S 7/4865* (2020.01)
  *G01S 17/14* (2020.01)
  *G01S 17/10* (2020.01)

(56) References Cited

U.S. PATENT DOCUMENTS

| | | | | |
|---|---|---|---|---|
| 6,310,682 | B1 * | 10/2001 | Gavish | G01S 7/4865 342/134 |
| 6,448,923 | B1 * | 9/2002 | Zrnic | G01S 13/951 342/26 R |
| 6,587,573 | B1 * | 7/2003 | Stam | B60Q 1/085 340/930 |
| 7,236,235 | B2 * | 6/2007 | Dimsdale | G01S 7/4865 356/5.01 |
| 2002/0117340 | A1 * | 8/2002 | Stettner | B60G 17/019 180/169 |
| 2002/0176067 | A1 * | 11/2002 | Charbon | G01S 7/487 356/4.01 |
| 2003/0043058 | A1 * | 3/2003 | Jamieson | G01C 23/005 340/961 |
| 2004/0051711 | A1 | 3/2004 | Dimsdale et al. | |
| 2005/0024249 | A1 | 2/2005 | Pavicic | |
| 2008/0246943 | A1 * | 10/2008 | Kaufman | G01B 11/2518 356/5.01 |
| 2009/0250616 | A1 | 10/2009 | Solf et al. | |
| 2010/0258708 | A1 | 10/2010 | Meyers et al. | |
| 2012/0194798 | A1 * | 8/2012 | Crawford | G01S 7/4873 356/4.02 |
| 2012/0281806 | A1 | 11/2012 | Masters | |
| 2012/0312966 | A1 * | 12/2012 | Suzuki | G01S 17/89 250/208.1 |
| 2013/0188766 | A1 * | 7/2013 | Williams | G01S 17/105 377/19 |
| 2014/0111812 | A1 | 4/2014 | Baeg et al. | |
| 2014/0175294 | A1 | 6/2014 | Frach | |
| 2014/0350836 | A1 * | 11/2014 | Stettner | G01S 17/023 701/301 |
| 2015/0116695 | A1 | 4/2015 | Bartolome et al. | |
| 2015/0211849 | A1 * | 7/2015 | Streuber | G01C 3/08 356/4.01 |
| 2015/0362586 | A1 * | 12/2015 | Heinrich | G01S 17/08 356/5.01 |

FOREIGN PATENT DOCUMENTS

| | | |
|---|---|---|
| CN | 103760570 A | 4/2014 |
| CN | 104142508 A | 11/2014 |
| JP | H03174530 A | 7/1991 |
| JP | 3044146 B2 | 5/2000 |
| JP | 2004532391 A | 10/2004 |
| JP | 2007526448 A | 9/2007 |
| JP | 2008506115 A | 2/2008 |
| JP | 2012237625 A | 12/2012 |
| JP | 2013160769 A | 8/2013 |
| KR | 20140131258 A | 11/2014 |
| WO | 2013176362 A1 | 11/2013 |

\* cited by examiner

LIDAR SYSTEM WITH REFLECTED SIGNAL STRENGTH MEASUREMENT

CROSS-REFERENCE TO RELATED APPLICATION

The present Application for Patent claims the benefit of U.S. Provisional Application No. 62/234,328, entitled "LIDAR SYSTEM WITH REFLECTED SIGNAL STRENGTH MEASUREMENT" filed Sep. 29, 2015, assigned to the assignee hereof, and expressly incorporated herein by reference in its entirety.

FIELD OF DISCLOSURE

This disclosure relates generally to Light Detection And Ranging (LIDAR) systems.

BACKGROUND

For LIDAR and/or LADAR (i.e., Laser Detection And Ranging) systems, it may be beneficial to be able to extract information about intensity/energy of reflected signals (in addition to timing information). This information may allow enhancement of post processing analysis of the LIDAR/LADAR data by providing information about location of the scatter, and strength of the reflected light. For example, as real LIDAR/LADAR systems often operate in the presence of strong noise signals (from the sun, high beams of cars, etc.), this noise will leak into the receive path of the system, and this noise may impact the accuracy and reliability of the object detection. Correlation of the received signal strength enables the LIDAR system to implement reliability metrics—when detecting objects with stronger reflection signals, the LIDAR system can assign them higher confidence values, and thus enable more efficient post processing of the data.

In one LIDAR system, high performance speed and accuracy Analog-to-Digital converters (ADC) are used to digitize the LIDAR signal trace directly. The advantage of using such high performance ADCs is that they allow direct measurement of the received signal strength, and good resolution between multiple reflections. However, the requirements for these ADCs are very high. ADCs that can meet these requirements tend to be expensive and consume a lot of power.

Other LIDAR systems may utilize a multi-channel Time-to-Distance (also referred to herein as time-to-digital) Converter (TDC). TDCs are a significantly simpler solution than ADCs, relatively in-expensive, and do not require a lot of power to operate. However, while TDCs can directly measure timing information of the reflected signal, TDCs may be very inaccurate in estimating the power of the reflected light.

SUMMARY

Aspects of the present disclosure include a method, an apparatus, a LIDAR system, and computer-readable medium for assisting or otherwise performing a reflected signal strength measurement in a LIDAR system.

For example, according to one aspect, an example LIDAR system includes a detector, an amplifier, a time-to-digital converter (TDC), an integrator, an analog-to-digital converter (ADC), and a processor. The detector is configured to receive a reflected light pulse, where the reflected light pulse is reflected off of an object. The amplifier is coupled to the detector to generate an analog signal in response to the reflected light pulse. The TDC is coupled to the amplifier to generate at least a first time data and a second time data in response to the analog signal. The integrator is coupled to the amplifier to integrate the analog signal. The ADC is coupled to the integrator to sample an output of the integrator and to generate a digital sample. The processor is configured to process the first time data, the second time data, and the digital sample to estimate a total reflected energy of the reflected light pulse.

According to another aspect, an example method for use with a LIDAR system includes receiving a reflected light pulse at a detector of the LIDAR system, where the reflected light pulse is reflected off of an object. The method further includes generating an analog signal in response to the reflected light pulse, where the analog signal is representative of the reflected light pulse, and generating at least a first time data and a second time data with a time-to-digital converter (TDC) in response to the analog signal. The method also includes integrating the analog signal with an integrator and sampling an output of the integrator with an analog-to-digital converter (ADC) at one or more sampling times to generate a digital sample representative of the output of the integrator. The first time data, the second time data, and the digital sample are then processed to estimate a total reflected energy of the reflected light pulse.

In yet another aspect, an example LIDAR system includes memory and a processor coupled to the memory. The memory is adapted to store program code and the processor is configured to access and execute instructions included in the program code to direct the LIDAR system to: (i) receive a reflected light pulse at a detector of the LIDAR system, where the reflected light pulse is reflected off of an object; (ii) generate an analog signal in response to the reflected light pulse, where the analog signal is representative of the reflected light pulse; (iii) generate at least a first time data and a second time data with a time-to-digital converter (TDC) in response to the analog signal; (iv) integrate the analog signal with an integrator; (v) sample an output of the integrator with an analog-to-digital converter (ADC) at one or more sampling times to generate a digital sample representative of the output of the integrator; and (vi) process the first time data, the second time data, and the digital sample to estimate a total reflected energy of the reflected light pulse.

In another aspect, a LIDAR system includes: (i) means for receiving a reflected light pulse at a detector of the LIDAR system, where the reflected light pulse is reflected off of an object; (ii) means for generating an analog signal in response to the reflected light pulse, wherein the analog signal is representative of the reflected light pulse; (iii) means for generating at least a first time data and a second time data in response to the analog signal; (iv) means for integrating the analog signal; (v) means for sampling an output of the means for integrating at one or more sampling times to generate a digital sample representative of the output of the means for integrating; and (vi) means for processing the first time data, the second time data, and the digital sample to estimate a total reflected energy of the reflected light pulse.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the present disclosure are disclosed in the following description and related drawings directed to specific embodiments. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter.

Figure 1:
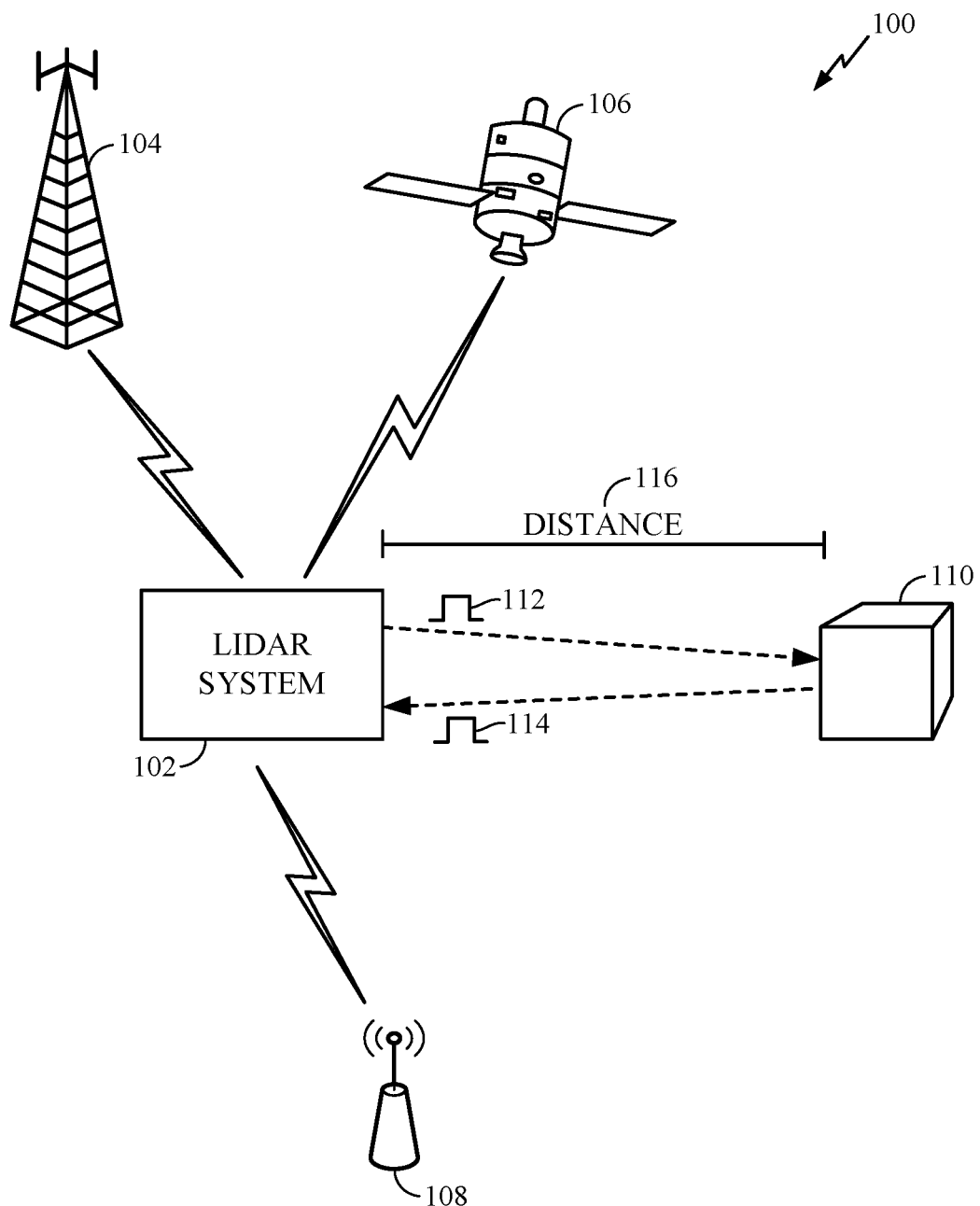
FIG. 1 is a block diagram illustrating an example LIDAR system.

FIG. 1 is a block diagram illustrating an example LIDAR system 102 operating in an environment 100. As shown in FIG. 1, LIDAR system 102 is configured to measure a distance 116 from LIDAR system 102 to object 110. In one aspect, LIDAR system 102 utilizes a Time of Flight method (ToF), where the LIDAR system 102 measures a time delay between the time at which a laser pulse 112 is sent into the environment 100, and the time at which the reflected pulse 114 (also referred to herein as an echo) is detected by the LIDAR system 102. As will be discussed in more detail below, the LIDAR system 102 is also configured to measure a signal strength of the reflected pulse 114 and/or a reflectance value of object 110.

In one aspect, LIDAR system 102 may determine its position/location to aide in the scanning of object 110 by way of one or more positioning systems. For example, a satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 106. For example, an SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The LIDAR system 102 is not limited to use with an SPS to determine its position/location, where such positioning techniques may also be implemented in conjunction with various wireless communication networks, including cellular towers 104 and from wireless communication access points 108, such as a wireless wide area network (WWAN), a wireless local area network (WLAN), and a wireless personal area network (WPAN). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 2:
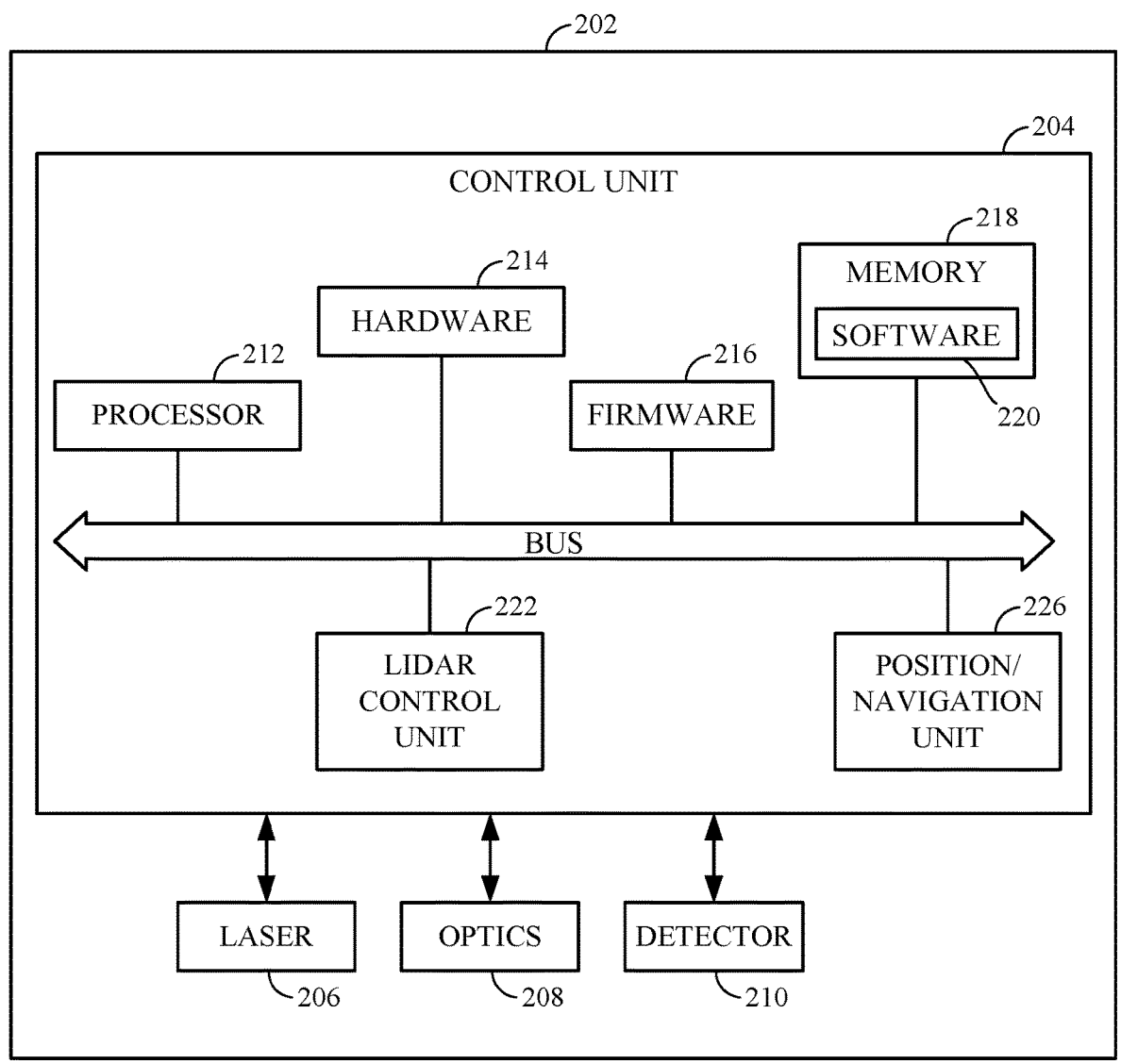
FIG. 2 is a block diagram illustrating an example LIDAR system.

FIG. 2 is a block diagram illustrating an example LIDAR system 202. LIDAR system 202 is one possible implementation of LIDAR system 102 of FIG. 1. LIDAR system 202 may also be a device including wireless communication devices, computers, laptops, etc. which are capable of LIDAR operations.

LIDAR system 202 includes a control unit 204 that is connected to and communicates with a laser 206, optics 208, and detector 210. The control unit 204 accepts and processes data received from detector 210. Control unit 204 may be provided by a processor 212, hardware 214, firmware 216, memory 218, and software 220.

The illustrated example of control unit 204 furthers includes a LIDAR control unit 222 and a position/navigation unit 226. Processor 212 and LIDAR control unit 222 are illustrated separately for clarity, but may be a single unit and/or implemented in the processor 212 based on instructions in the software 220 which is run in the processor 212. Processor 212, as well as the LIDAR control unit 222 can, but need not necessarily include, one or more microprocessors, embedded processors, controllers, application specific integrated circuits (ASICs), digital signal processors (DSPs), and the like. The term "processor" describes the functions implemented by the system rather than specific hardware. Moreover, as used herein the term "memory" refers to any type of computer storage medium, including long term, short term, or other memory associated with LIDAR system 202, and is not to be limited to any particular type of memory or number of memories, or type of media upon which memory is stored.

The laser 206 is configured to emit (e.g., produce, propagate) electromagnetic radiation at one or more frequencies that can be, for example, a coherent light emission (e.g., monochromatic light emission) or beam. Laser 206 may be configured to emit ultraviolet, visible, or near infrared light. In one aspect, the laser pulse generated by laser 206 is directed through optics 208, where the optics 208 control the angular resolution and range that can be detected by LIDAR system 202. Optics 208 may also be configured to receive the reflected pulse (e.g., reflected pulse 114) by way of a hole mirror or beam splitter. In some examples, optics 208 couple the optical transmit and receive paths together. However, in other examples, the optical transmit and receive paths are independent of each other. In one embodiment, optics 208 are configured to perform scanning operations to control the direction of the laser pulse generated by laser 206. For example, optics 208 may include hardware to scan the azimuth and elevation, such as dual oscillating plan mirrors, a polygon mirror, or a dual axis scanner. The detector 210 may be coupled to the optics 208 to receive and detect the reflected pulse (e.g., reflected pulse 14). In one embodiment, detector 210 includes a solid state photodetector, such as one or more silicon avalanche photodiodes. In another embodiment, detector 210 includes a photomultiplier. As will be discussed in more detail below, detector 210 may be also configured to detect a signal strength of the reflected pulse 114 and/or a reflectance value of the object 110.

As shown in FIG. 2, control unit 204 further includes a position/navigation unit 226 which may include one or more GPS receivers configured to perform or otherwise aide in the position determination of LIDAR system 202. LIDAR control unit 222 is configured to trigger the laser 206 at a firing time to generate a laser pulse (e.g., laser pulse 112 of FIG. 1). LIDAR control unit 222 may then determine a Time of Flight (ToF) and/or the signal strength of the reflected signal based on data received from detector 210.

The processes described herein may be implemented by various means depending upon the application. For example, these processes may be implemented in hardware 214, firmware 216, a combination of processor 212 and software 220, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 218 and executed by the processor 212. Memory 218 may be implemented within or external to the processor 212.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 3:
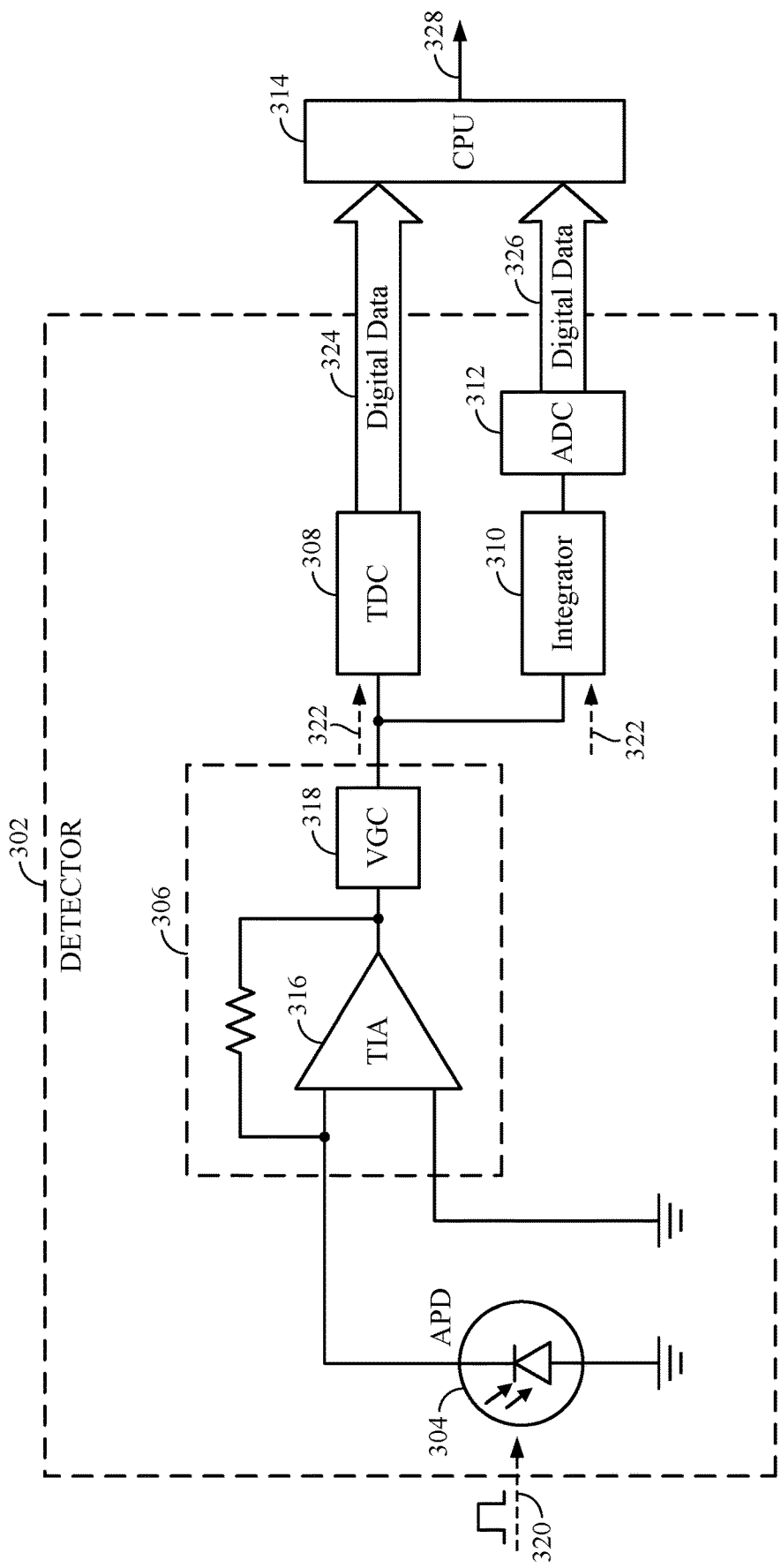
FIG. 3 is a block diagram illustrating an example detector of a LIDAR system.

FIG. 3 is a block diagram illustrating an example detector 302 of a LIDAR system. Detector 302 is one possible implementation of detector 210 of FIG. 2. The illustrated example of detector 302 includes a photosensitive element (e.g., avalanche photodiode (APD) 304), an amplifier 306, a time-to-digital converter (TDC) 308, an integrator 310, and an analog-to-digital converter (ADC) 312. The illustrated example of amplifier 306 includes a transimpedance amplifier (TIA) 316 and a variable gain control (VGC) circuit 318. Also shown in FIG. 3 is a processor 314. In one embodiment, processor 314 is included in detector 302. However, in another example, processor 314 may be included in LIDAR control unit 222 and/or may be processor 212 of FIG. 2.

In operation, a reflected light pulse 320, incident on the APD 304, generates a current pulse which is further amplified and converted into a voltage pulse in the TIA 316. The VGC circuit 318 is optional and may compensate for signal attenuation (e.g., as the distance to the scatter is increasing, received power is decreasing as $1/R^2$). Consequently, VGC circuit 318 is configured to compensate for this effect by increasing the gain of the VGC circuit 318, due to increasing distance (and time delay). As a result, an analog signal 322 at the output of the VGC circuit 318 will be the same for a given scatter across a scan range. In one example, the analog signal 322 tracks an instantaneous output of the APD 304. After the VGC circuit 318, the analog signal 322 is provided to both the TDC 308 and an integrator 310.

Figure 4A:
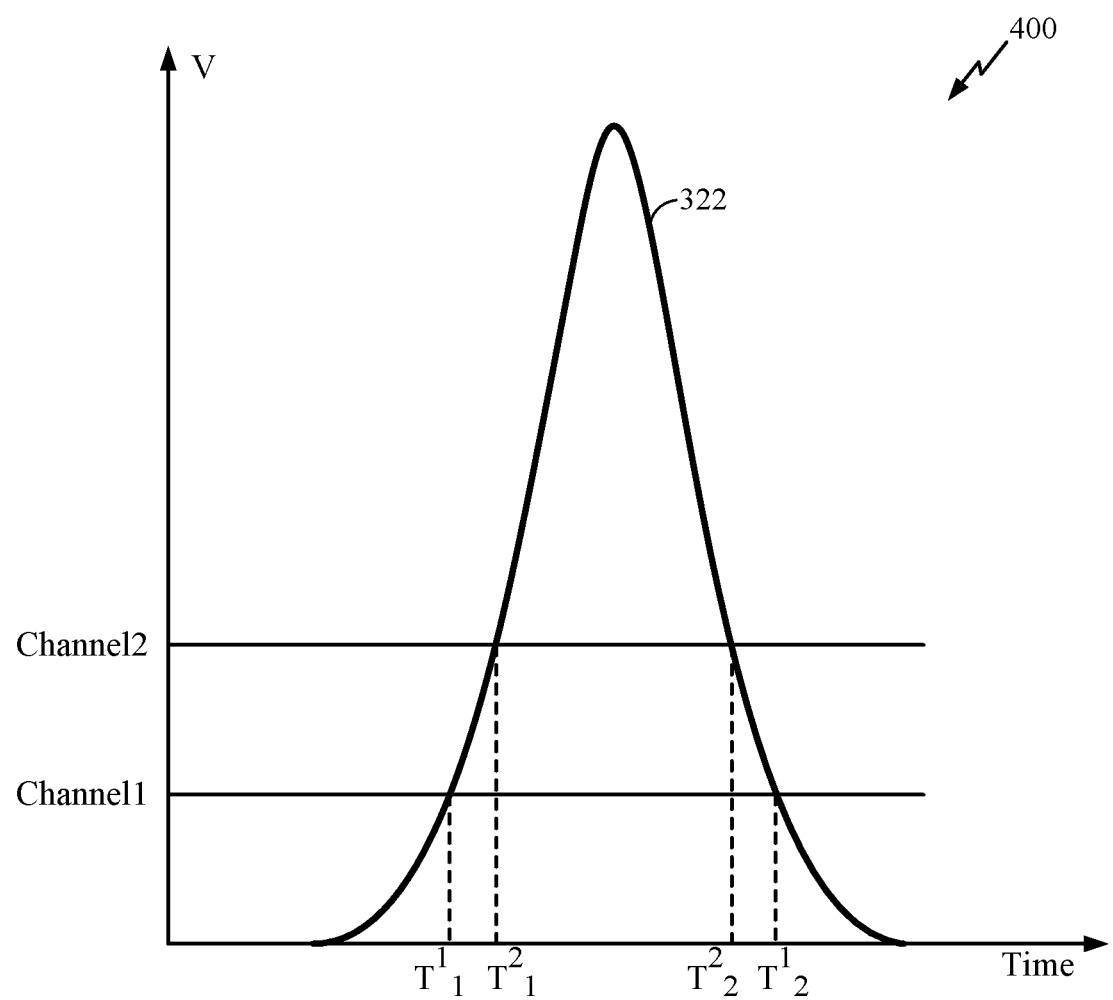
FIGS. 4A-4D is a timing diagram illustrating operation of a multi-channel TDC of a LIDAR system.

In one aspect, the TDC 308 is a high speed counter that starts counting with the firing of the laser 206 (START) and counts when it receives the reflected beam which essentially generates a STOP. In one example, TDC 308, may implement multiple measurement channels where each channel can register multiple STOPs triggered at different thresholds. In the example of FIG. 4A, TDC 308 implements two channels—Channel 1 and Channel 2, where each channel supports two STOPs. Both channels are armed when the LIDAR system 202 fires the pulse (e.g., LASER pulse 112), and they keep running until the reflected signal (represented by analog signal 322) crosses a predefined threshold. At this point the TDC 308 registers a STOP. In the illustrated example, information about the stops (e.g., timestamp and an associated voltage value) may be output from the TDC 308 as digital data 324. Although FIG. 4A illustrates TDC 308 as generating two STOPs per channel, TDC 308 may be configured to generate any number of STOPs per channel, including two or more.

Figure 4B:
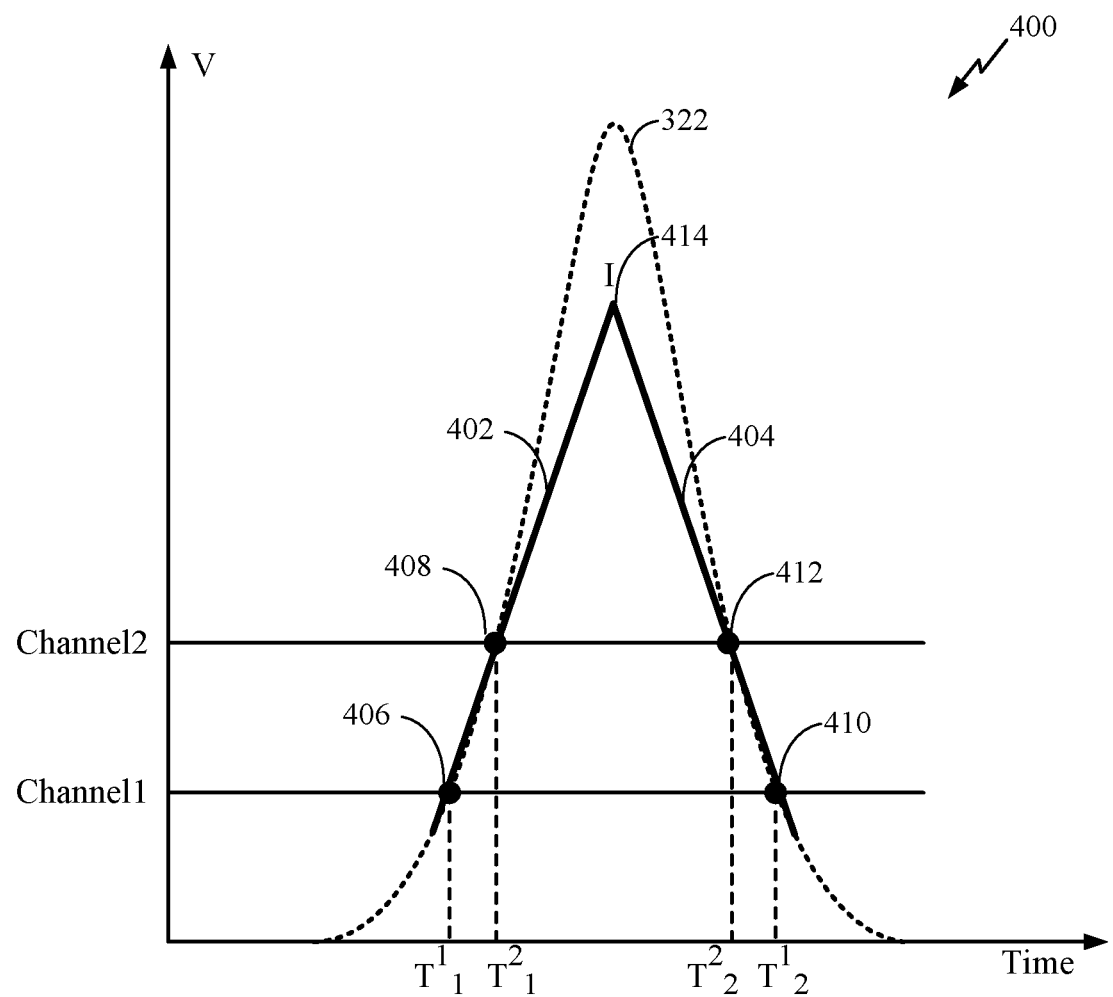

In the example timing diagram 400 shown in FIG. 4A, TDC 308 will generate two STOPs for Channel 1 (i.e., $T^1_1$, $T^1_2$), and two STOPs for Channel 2 (i.e., $T^2_1$, $T^2_2$). The STOPS may be output by the TDC 308 as digital time data 324. Respectively, the slope of the signal may be determined by the difference between counter values for $T^2_1-T^1_1$, or $T^1_2-T^2_2$. Furthermore, the center of the reflected signal may be measured as the average time between timestamps $T^1_1$ and $T^1_2$, or between timestamps $T^2_1$ and $T^2_2$. The slope of the analog signal 322 may allow an estimate of the maximum (i.e. peak) value of the pulse. For example, FIG. 4B illustrates an example method of estimating the maximum value of analog signal 322. In this example, a linear interpolation may be applied, where straight lines 402 and 404 are generated based on the various STOPs generated by TDC 308. That is, straight line 402 may be drawn through points, 406 and 408, where point 406 corresponds to the voltage value at timestamp $T^1_1$ and point 408 corresponds to the voltage value at timestamp $T^2_1$. Similarly, straight line 404 is drawn through points 410 and 412, where point 410 corresponds to the voltage value at timestamp $T^1_2$, and point 412 corresponds to the voltage value at timestamp $T^2_2$. Straight lines 402 and 404 may then be extended until they intersect. As shown in FIG. 4B, straight lines 402 and 404 form an intersection 414. The voltage value I at intersection 414 may be representative of an estimate of the maximum value of analog signal 322.

Thus, as shown above, the points located on the curve shown in FIG. 4B are representative of an immediate power of the analog signal and may be utilized to estimate the maximum (e.g., peak) value of the reflected light pulse. However, in some examples it may be desirable to provide an estimate of the total reflected energy of the reflected light pulse. In one example, the total reflected energy of the reflected light pulse is represented by the area under the curve, shown as analog signal 322 in FIG. 4B.

However, an estimation of the total reflected energy based solely on the output of TDC 308, may be inaccurate, as the measurements of the analog signal 322 are performed in the presence of strong noise, which may contribute to errors in measuring corresponding time data. Thus, the accuracy of the measurement of the total reflected energy based solely on the output of the TDC 308 may be relatively low.

Accordingly, embodiments disclosed herein include the addition of integrator 310 in parallel to TDC 308. The integrator 310 is configured to integrate the analog signal 322 over a predefined time interval. In one aspect, the integrator 310 could be implemented using passive, active, or a combination of passive and active components, such as an Op-Amp integrator or a capacitor, or other device with similar functionality.

The integrator 310 is configured to accumulate a charge which is generated by one or more pulses of analog signal 322, and ADC 312 is configured to generate digital samples 326 of the charge accumulated at the output of the integrator 310. The digital samples 326, along with the digital time data 324 (i.e., TDC STOP data) can then be provided to the processor 314 for post-processing the scan data and to correlate the digital time data 324 with the digital samples 326 to generate an estimate 328 of the total reflected energy and/or the reflectance of the object on which the laser is incident.

Figure 4D:
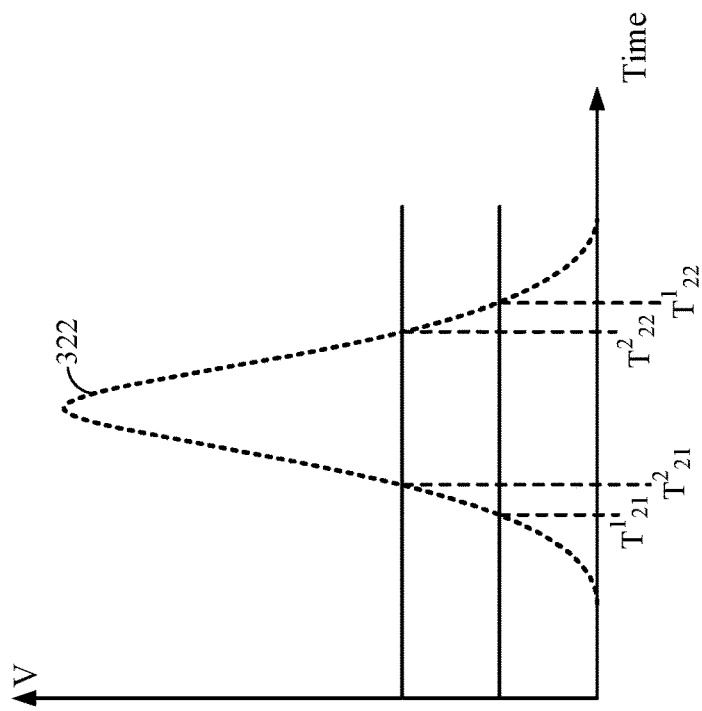
Figure 4C:
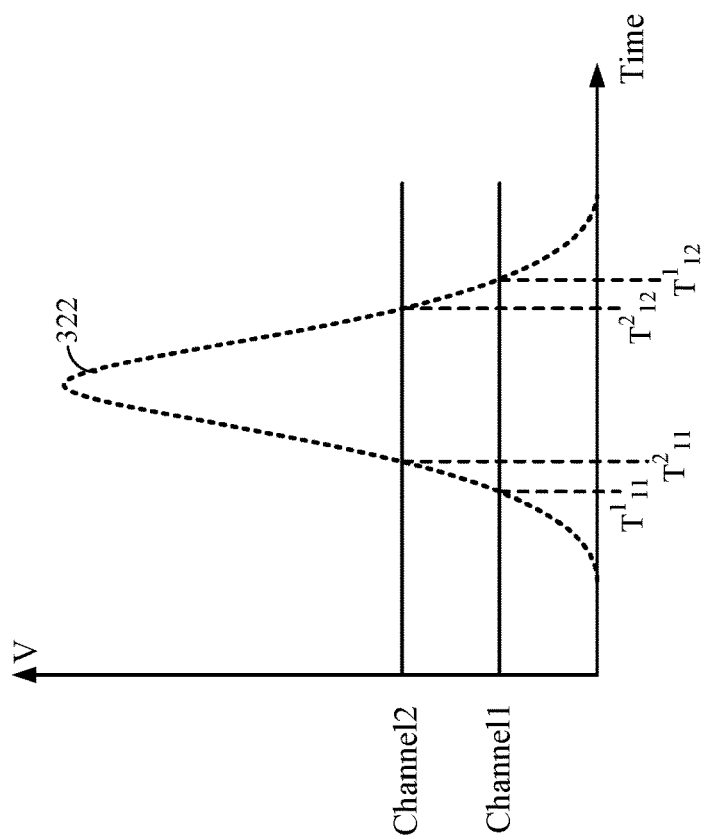

By way of example, FIG. 4C illustrates a scan of a reflected light pulse and FIG. 4D illustrates a consecutive scan of the reflected light pulse. In this example, the reflected light pulse in both scans of FIGS. 4C and 4D is similar, if not identical. However, the timestamps of the threshold crossings generated by TDC 308 may be measured with some error.

Table 1, below, illustrates example values of the timestamps generated by TDC 308 for the consecutive scans of FIGS. 4C and 4D.

TABLE 1

| | Voltage | Scan 1 - Time Stamps IN ($T^1_{11}$, $T^2_{11}$) | Scan 1 - Time Stamps OUT ($T^1_{12}$, $T^2_{12}$) | Scan 2 - Time Stamps IN ($T^1_{21}$, $T^2_{21}$) | Scan 2 - Time Stamps OUT ($T^1_{22}$, $T^2_{22}$) |
|---|---|---|---|---|---|
| Channel 1 | 1 V | 568 ns | 588 ns | 569 ns | 588 ns |
| Channel 2 | 2 V | 573 ns | 583 ns | 573 ns | 583 ns |

As can be seen from the table above, there is a 1 ns difference between just one of the time stamps for the second scan. That is, timestamp $T^1_{11}$ is measured by TDC 308 as 568 ns, whereas timestamp $T^1_{21}$ is measured as 569 ns. Consequently, using only the timestamp values, an estimation of the maximum value (e.g., voltage value I at intersection 414) for the scan of FIG. 4C results in a value of 3V, whereas an estimation of the maximum value for the scan of FIG. 4D results in a value of 3.1V. Estimates of the total reflected energy based on such estimates of the maximum value may result in significant error.

Accordingly, aspects provided herein, may improve estimates of the maximum value of the analog signal 322 and/or improve estimates of the total reflected energy by utilizing the digital samples 326 provided by ADC 312. That is, in some aspects, the values derived from the integrator 310

(e.g., digital samples 326) may be used as a normalizing coefficient when estimating the maximum value and/or total reflected energy of analog signal 322. For example, assume that the digital samples 326 indicate a pulse energy E of analog signal 322 as 45 mV (i.e., E=45 mV). Next, an assumption may be made that the area of a rectangle is linearly proportional to the total reflected energy E. The assumed rectangle is defined to have a height equal to the maximum value of analog signal 322 (e.g., voltage value I at intersection 414) and a width equal to the pulse duration of analog signal 322. In one example, the pulse duration may be the average between the corresponding timestamps of the channels used by TDC 308. That is, the pulse duration of the analog signal 322 of the scan of FIG. 4C may be determined as $$\frac{(T_{12}^1 - T_{11}^1) + (T_{12}^2 - T_{11}^2)}{2}.$$

Using the values from TABLE 1, above, the pulse duration of the analog signal 322 of FIG. 4C is calculated to be 15 ns. Thus, the signal strength (i.e., the maximum value) of analog signal 322 in FIG. 4C may be estimated as proportional to 45 mV/15 ns, or 3 mV/ns.

Similarly, the pulse duration of the analog signal 322 of the scan of FIG. 4D may be determined as $$\frac{(T_{22}^1 - T_{21}^1) + (T_{22}^2 - T_{21}^2)}{2}.$$

Again, using the values from TABLE 1, above, the pulse duration of the analog signal 322 of FIG. 4D is calculated to be 14.5 ns. Thus, the signal strength (i.e., the maximum value) of analog signal 322 in FIG. 4D may be estimated as proportional to 45 mV/14.5 ns, or 3.11 mV/ns.

As can be seen from the above, estimates of the maximum value of the analog signal 322 based on the timestamps only would render value of 3V for the scan of FIG. 4C, and a value of 3.11V for the scan of FIG. 4D. However, factoring in the pulse energy, as represented by the digital samples 326, results in values of 3 mV/ns and 3.1 mV/ns, respectively.

Figure 5:
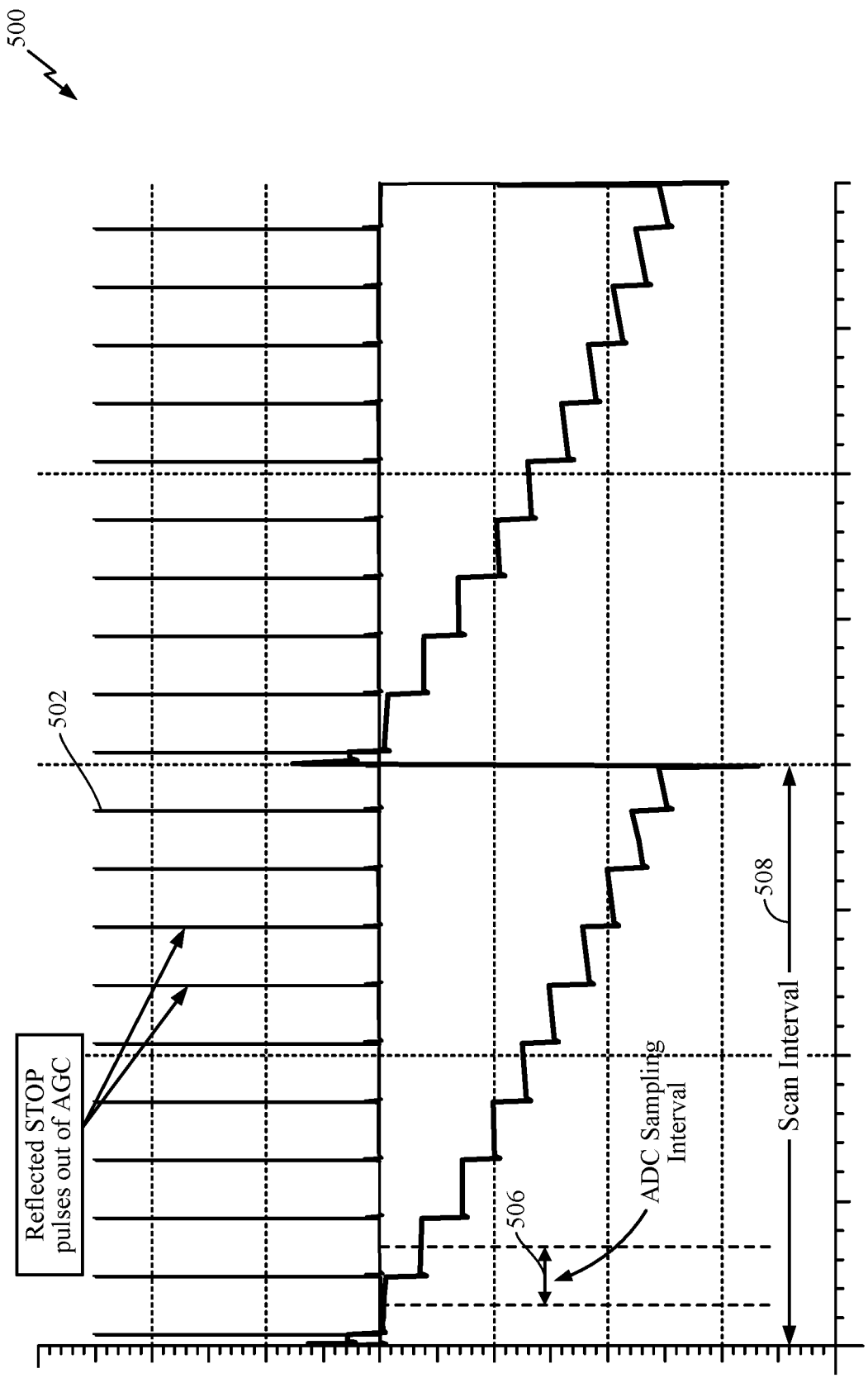
FIG. 5 is a timing diagram illustrating operation of an integrator of a LIDAR system.

FIG. 5 is a timing diagram 500 illustrating operation of integrator 310 and ADC 312 of LIDAR system 202. A laser pulse generated by LIDAR system 202 is reflected by equally spaced identical scatters, which are received by the APD 304, and in turn generates electric pulses at the output of the APD 304. After passing through the amplifier 306, these echoes show up as equidistant pulses 502 of equal amplitude.

Thus, the integrator 310 accumulates (over a predefined ADC sampling time 506) the charge which is generated by all the reflected pulses received and the noise during a scan interval 508. Simultaneously an ADC 312 digitizes multiple samples of the charge accumulated at the output of the integrator 310 during the scan interval 508. In one aspect, the scan interval 508 corresponds to a range of operation of the LIDAR system 202. For example, the range of operation may correspond to a range of time during which the LIDAR system 202 expects to have received all pulses 502 for a given laser pulse.

The digital samples 326, along with the digital time data 324 (i.e., TDC STOP data) can then be provided to the processor 314 for post-processing the scan data and to correlate the digital time data 324 with the digital samples 326 to generate an estimate 328 of the total reflected energy and/or the reflectance of the object on which the laser is incident.

Figure 6:
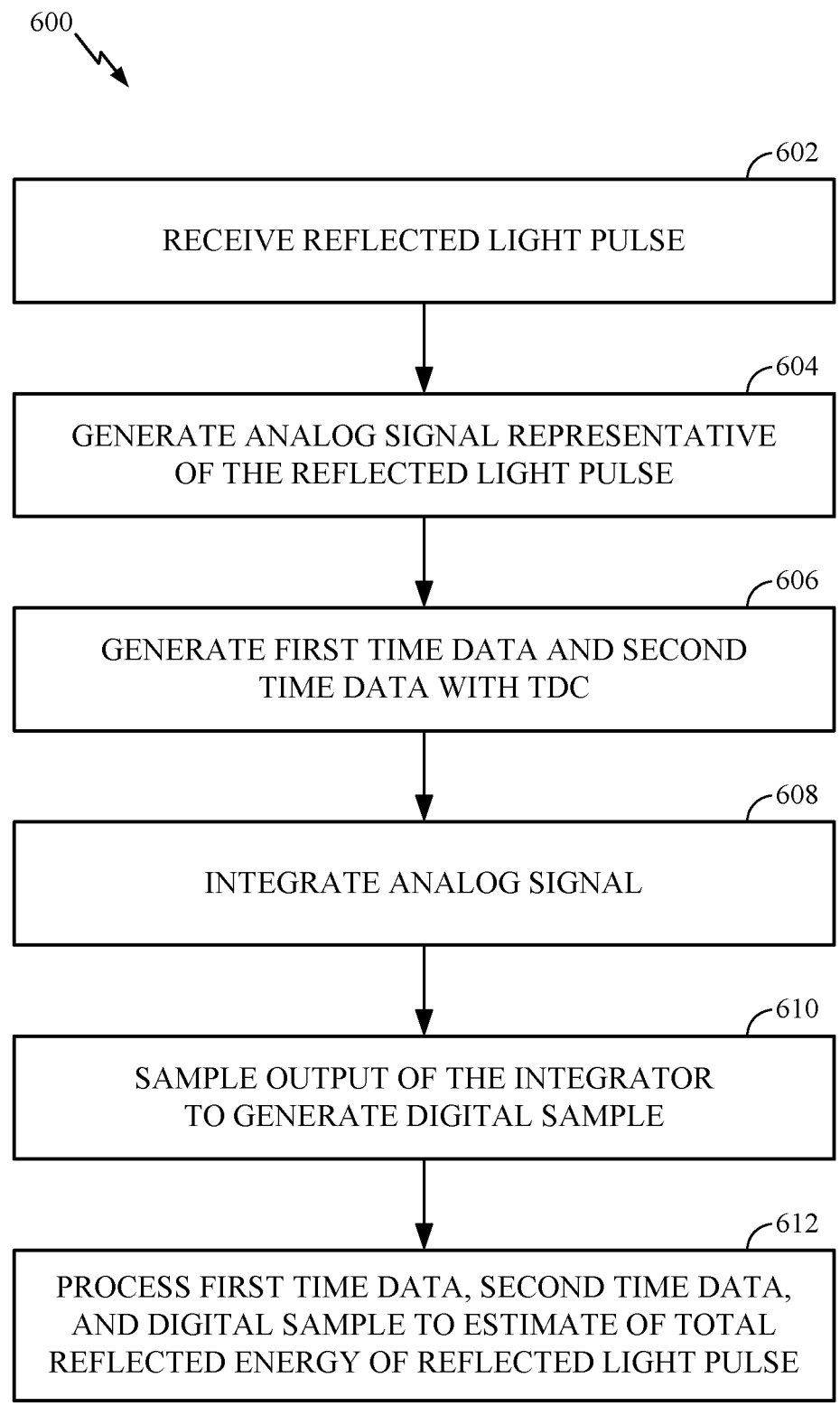
FIG. 6 is a flowchart illustrating an example process of performing a reflected signal strength measurement in a LIDAR system.

FIG. 6 is a flowchart illustrating an example process 600 of performing a reflected signal strength measurement in a LIDAR system. Process 600 is one possible process performed by LIDAR system 202 of FIG. 2. In a process block 602, detector 302 of FIG. 3, receives a reflected light pulse (e.g., APD 304 receives reflected light pulse 320). In process block 604, amplifier 306 generates an analog signal 322 in response to the reflected light pulse 320. In a process block 606, the TDC 308 generates first and second digital time data 324 that are representative of at least two STOPS corresponding to the reflected light pulse 320. In a process block 608, the integrator 310 integrates the analog signal 322 over a scan interval 508. In a process block 610, ADC 312 samples the output of the integrator 310 to generate one or more digital samples 326 that are representative of the output of the integrator 310. In a process block 612, processor 314 processes the first and second digital time data 324 along with the digital sample(s) 326 to provide an estimate 328 of the total reflected energy and/or a reflectance value of object 110.

Figure 7:
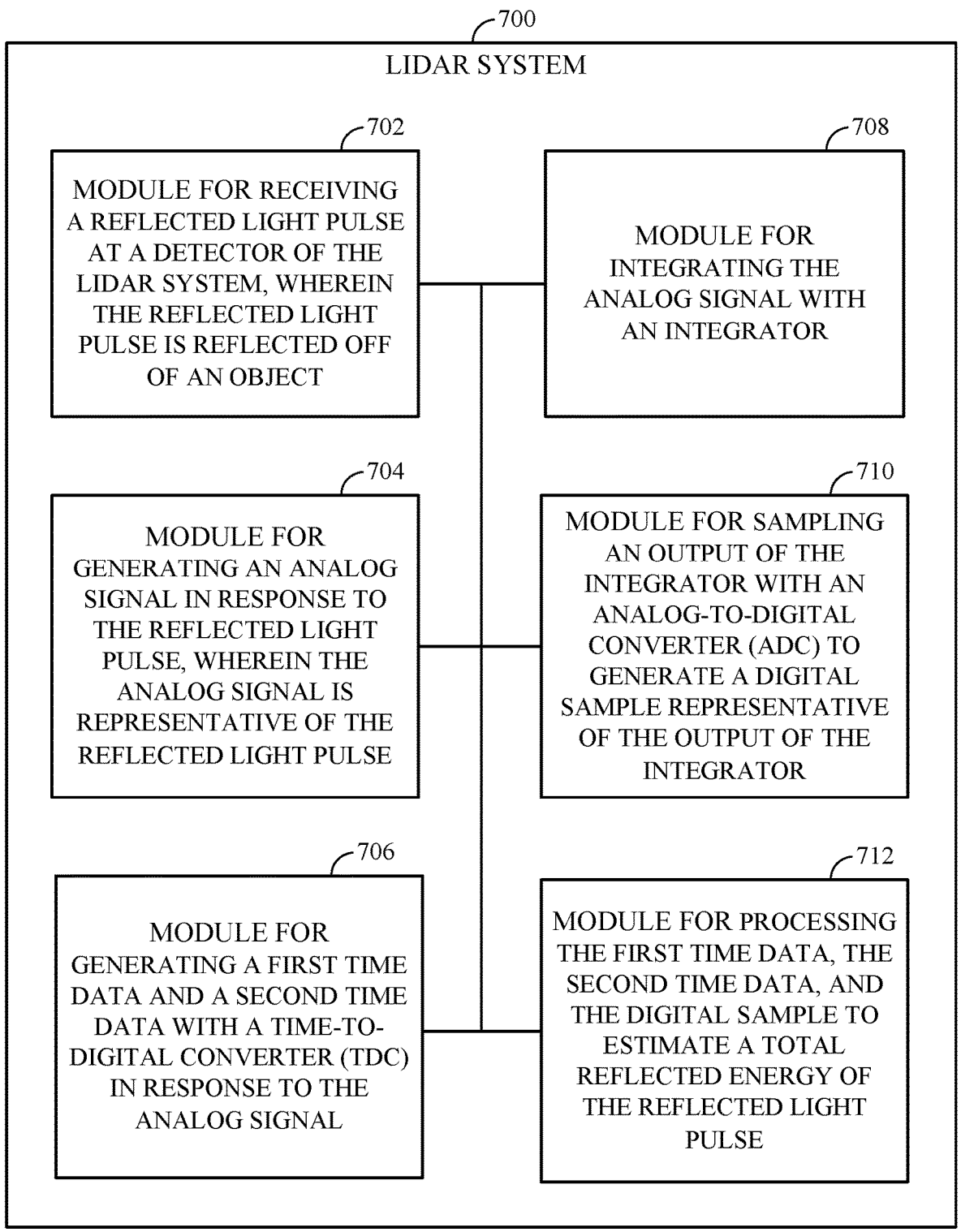
FIG. 7 is a simplified block diagram of several sample aspects of components that may be employed in a LIDAR system and configured to support performing a reflected signal strength measurement as taught herein.

FIG. 7 is a simplified block diagram of several sample aspects of components that may be employed in a LIDAR system and configured to support performing a reflected signal strength measurement as taught herein. LIDAR system 700 is one possible implementation of LIDAR system 102 and/or 202. A module 702 for receiving a reflected light pulse at a detector of the LIDAR system may correspond at least in some aspects to, for example, a detector 210 and/or APD 304, as discussed herein. A module 704 for generating an analog signal in response to the reflected light pulse may correspond at least in some aspects to, for example, an amplifier 306, as discussed herein. A module 706 for generating a first time data and a second time data may correspond at least in some aspects to, for example, TDC 308, as discussed herein. A module 708 for integrating the analog signal with an integrator may correspond at least in some aspects to, for example, integrator 310, as discussed herein. A module 710 for sampling an output of the integrator may correspond at least in some aspects to, for example, ADC 312, as discussed herein. A module 712 for processing the first time data, the second time data, and the digital sample may correspond at least in some aspects to, for example, processor 314, LIDAR control unit 222, and/or processor 212, as discussed herein.

The functionality of the modules 702-712 of FIG. 7 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer-readable media embodying a method for performing a reflected signal strength measurement in a LIDAR system. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for use with a LIght Detection And Ranging (LIDAR) system, the method comprising:
   receiving a reflected light pulse at a detector of the LIDAR system, wherein the reflected light pulse is reflected off of an object;
   generating an analog signal in response to the reflected light pulse, wherein the analog signal is representative of the reflected light pulse;
   generating digital time data comprising at least a first time data and a second time data with a time-to-digital converter (TDC) in response to the analog signal, wherein the first time data comprises a first time stamp of a first channel, a second time stamp of the first channel, and a first voltage threshold, and the second time data comprises a first time stamp of a second channel, a second time stamp of the second channel, and a second voltage threshold;
   integrating the analog signal with an integrator, the integrator in parallel to the TDC;
   sampling an output of the integrator with an analog-to-digital converter (ADC) at one or more sampling times to generate a digital sample that is representative of the output of the integrator; and
   processing the digital time data and the digital sample to estimate a total reflected energy of the reflected light pulse, wherein the processing includes correlating the digital time data and the digital sample, and further estimating a reflectance of the object based on correlating the digital time data and the digital sample, wherein correlating the digital time data and the digital sample to estimate the total reflected energy of the reflected light pulse includes at least:
   estimating a duration of the reflected light pulse; and
   estimating a maximum value of the analog signal based on the estimated duration of the reflected light pulse, wherein the maximum value of the analog signal is estimated as being proportional to a ratio of a value of the digital sample to the estimated duration.

2. The method of claim 1, wherein the first time stamp and second time stamp of the first channel correspond to the analog signal reaching the first voltage threshold respectively at first and second times, and the first time stamp and second time stamp of the second channel correspond to the analog signal reaching the second voltage threshold respectively at third and fourth times.

3. The method of claim 1, wherein integrating the analog signal comprises integrating the analog signal over a scan interval of the LIDAR system.

4. The method of claim 3, wherein the scan interval corresponds to a range of operation of the LIDAR system.

5. The method of claim 1, wherein the analog signal tracks an instantaneous output of a photosensitive element of the detector.

6. The method of claim 1, wherein estimating a duration of the reflected light pulse includes determining an average of:
   a difference between the second time stamp of the first channel and the first time stamp of the first channel, and
   a difference between the second time stamp of the second channel and the first time stamp of the second channel.

7. A LIght Detection And Ranging (LIDAR) system, comprising:
   memory adapted to store program code; and
   a processor coupled to the memory to access and execute instructions included in the program code to direct the LIDAR system to:

receive a reflected light pulse at a detector of the LIDAR system, wherein the reflected light pulse is reflected off of an object;

generate an analog signal in response to the reflected light pulse, wherein the analog signal is representative of the reflected light pulse;

generate digital time data comprising at least a first time data and a second time data with a time-to-digital converter (TDC) in response to the analog signal, wherein the first time data comprises a first time stamp of a first channel, a second time stamp of the first channel, and a first voltage threshold, and the second time data comprises a first time stamp of a second channel, a second time stamp of the second channel, and a second voltage threshold;

integrate the analog signal with an integrator, the integrator in parallel to the TDC;

sample an output of the integrator with an analog-to-digital converter (ADC) at one or more sampling times to generate a digital sample that is representative of the output of the integrator; and process the digital time data and the digital sample to estimate a total reflected energy of the reflected light pulse, wherein the processing includes correlating the digital time data and the digital sample, and further estimating a reflectance of the object based on correlating the digital time data and the digital sample, wherein correlating the digital time data and the digital sample to estimate a total reflected energy of the reflected light pulse includes at least:

estimating a duration of the reflected light pulse; and estimating a maximum value of the analog signal based on the estimated duration of the reflected light pulse, wherein the maximum value of the analog signal is estimated as being proportional to a ratio of a value of the digital sample to the estimated duration.

8. The LIDAR system of claim 7, wherein-the first time stamp and second time stamp of the first channel correspond to the analog signal reaching the first voltage threshold respectively at first and second times, and the first time stamp and second time stamp of the second channel correspond to the analog signal reaching the second voltage threshold respectively at third and fourth times.

9. The LIDAR system of claim 7, wherein the program code further comprises instructions to direct the LIDAR system to integrate the analog signal over a scan interval of the LIDAR system.

10. The LIDAR system of claim 9, wherein the scan interval corresponds to a range of operation of the LIDAR system.

11. The LIDAR system of claim 7, wherein the analog signal tracks an instantaneous output of a photosensitive element of the detector.

12. The LIDAR system of claim 7, wherein estimating a duration of the reflected light pulse includes determining an average of:

a difference between the second time stamp of the first channel and the first time stamp of the first channel, and a difference between the second time stamp of the second channel and the first time stamp of the second channel.

13. A method for use with a LIght Detection And Ranging (LIDAR) system, the method comprising:

receiving a reflected light pulse at a detector of the LIDAR system, wherein the reflected light pulse is reflected off of an object;

generating an analog signal in response to the reflected light pulse, wherein the analog signal is representative of the reflected light pulse;

generating digital time data comprising at least a first time data and a second time data with a time-to-digital converter (TDC) in response to the analog signal, wherein the first time data comprises a first time stamp of a first channel, a second time stamp of the first channel, and a first voltage threshold, and the second time data comprises a first time stamp of a second channel, a second time stamp of the second channel, and a second voltage threshold;

integrating the analog signal with an integrator, the integrator in parallel to the TDC;

sampling an output of the integrator with an analog-to-digital converter (ADC) at one or more sampling times to generate a digital sample that is representative of the output of the integrator; and processing the digital time data and the digital sample to estimate a total reflected energy of the reflected light pulse, wherein the processing includes correlating the digital time data and the digital sample, and further estimating a reflectance of the object based on correlating the digital time data and the digital sample, wherein correlating the digital time data and the digital sample to estimate the total reflected energy of the reflected light pulse includes at least:

estimating a duration of the reflected light pulse, wherein estimating the duration of the reflected light pulse includes determining an average of:

a difference between the second time stamp of the first channel and the first time stamp of the first channel, and a difference between the second time stamp of the second channel and the first time stamp of the second channel; and estimating a maximum value of the analog signal based on the estimated duration of the reflected light pulse.

14. The method of claim 13, wherein the first time stamp and second time stamp of the first channel correspond to the analog signal reaching the first voltage threshold respectively at first and second times, and the first time stamp and second time stamp of the second channel correspond to the analog signal reaching the second voltage threshold respectively at third and fourth times.

15. The method of claim 13, wherein integrating the analog signal comprises integrating the analog signal over a scan interval of the LIDAR system.

16. The method of claim 15, wherein the scan interval corresponds to a range of operation of the LIDAR system.

17. The method of claim 13, wherein the analog signal tracks an instantaneous output of a photosensitive element of the detector.

18. The method of claim 13, wherein the maximum value of the analog signal is estimated as being proportional to a ratio of a value of the digital sample to the estimated duration.

19. A LIght Detection And Ranging (LIDAR) system, comprising:

memory adapted to store program code; and a processor coupled to the memory to access and execute instructions included in the program code to direct the LIDAR system to:

receive a reflected light pulse at a detector of the LIDAR system, wherein the reflected light pulse is reflected off of an object;

generate an analog signal in response to the reflected light pulse, wherein the analog signal is representative of the reflected light pulse;

generate digital time data comprising at least a first time data and a second time data with a time-to-digital converter (TDC) in response to the analog signal, wherein the first time data comprises a first time stamp of a first channel, a second time stamp of the first channel, and a first voltage threshold, and the second time data comprises a first time stamp of a second channel, a second time stamp of the second channel, and a second voltage threshold;

integrate the analog signal with an integrator, the integrator in parallel to the TDC;

sample an output of the integrator with an analog-to-digital converter (ADC) at one or more sampling times to generate a digital sample that is representative of the output of the integrator; and process the digital time data and the digital sample to estimate a total reflected energy of the reflected light pulse, wherein the processing includes correlating the digital time data and the digital sample, and further estimating a reflectance of the object based on correlating the digital time data and the digital sample, wherein correlating the digital time data and the digital sample to estimate a total reflected energy of the reflected light pulse includes at least:

estimating a duration of the reflected light pulse, wherein estimating the duration of the reflected light pulse includes determining an average of:

a difference between the second time stamp of the first channel and the first time stamp of the first channel, and a difference between the second time stamp of the second channel and the first time stamp of the second channel; and estimating a maximum value of the analog signal based on the estimated duration of the reflected light pulse.

20. The LIDAR system of claim 19, wherein-the first time stamp and second time stamp of the first channel correspond to the analog signal reaching the first voltage threshold respectively at first and second times, and the first time stamp and second time stamp of the second channel correspond to the analog signal reaching the second voltage threshold respectively at third and fourth times.

21. The LIDAR system of claim 19, wherein the program code further comprises instructions to direct the LIDAR system to integrate the analog signal over a scan interval of the LIDAR system.

22. The LIDAR system of claim 21, wherein the scan interval corresponds to a range of operation of the LIDAR system.

23. The LIDAR system of claim 19, wherein the analog signal tracks an instantaneous output of a photosensitive element of the detector.

24. The LIDAR system of claim 19, wherein the maximum value of the analog signal is estimated as being proportional to a ratio of a value of the digital sample to the estimated duration.

* * * * *